(12) United States Patent
Manicke et al.

(10) Patent No.: US 11,581,175 B2
(45) Date of Patent: Feb. 14, 2023

(54) CARTRIDGES, SYSTEMS, AND METHODS FOR MASS SPECTROMETRY

(71) Applicant: Indiana University Research and Technology Corporation, Indianapolis, IN (US)

(72) Inventors: Nicholas Manicke, Zionsville, IN (US); Chengsen Zhang, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 521 days.

(21) Appl. No.: 16/334,329

(22) PCT Filed: Sep. 19, 2017

(86) PCT No.: PCT/US2017/052236
§ 371 (c)(1),
(2) Date: Mar. 18, 2019

(87) PCT Pub. No.: WO2018/053495
PCT Pub. Date: Mar. 22, 2018

(65) Prior Publication Data
US 2021/0296106 A1     Sep. 23, 2021

Related U.S. Application Data

(60) Provisional application No. 62/396,768, filed on Sep. 19, 2016.

(51) Int. Cl.
*H01J 49/04*     (2006.01)
*H01J 49/16*     (2006.01)

(52) U.S. Cl.
CPC ...... *H01J 49/0409* (2013.01); *H01J 49/0431* (2013.01); *H01J 49/16* (2013.01)

(58) Field of Classification Search
None
See application file for complete search history.

(56) References Cited

U.S. PATENT DOCUMENTS

| | | | |
|---|---|---|---|
| 2005/0230635 A1 | 10/2005 | Takats et al. | |
| 2013/0330714 A1* | 12/2013 | Cooks | C12Q 1/04 435/5 |
| 2014/0183351 A1* | 7/2014 | Cooks | H01J 49/0409 250/282 |

FOREIGN PATENT DOCUMENTS

| | | | |
|---|---|---|---|
| WO | WO-2012170301 A1 * | 12/2012 | ......... H01J 49/0431 |
| WO | 2016/020678 A1 | 2/2016 | |
| WO | 2016/130646 A1 | 8/2016 | |

OTHER PUBLICATIONS

Yang et al., "Paper spray ionization devices for Direct, biomedical analysis using mass spectrometry" Int. J Mass Spectrom. (Year: 2012).*

(Continued)

*Primary Examiner* — Michael J Logie
(74) *Attorney, Agent, or Firm* — Barnes & Thornburg, LLP; Jessamine Pilcher

(57) ABSTRACT

Mass spectrometry cartridge including a base in mechanical communication with a spray substrate holder, an absorbent pad between the base and the spray substrate holder, a translatable sample well holder interposed between the spray substrate holder and a top cover, the top cover configured to house a conductive element, wherein when the translatable sample well holder is in a first position, the translatable well holder is vertically above the absorbent pad, when the translatable sample well holder is in a second position, the translatable well holder is vertically above a spray substrate are disclosed. Methods of analyzing a sample are also disclosed.

17 Claims, 12 Drawing Sheets

(56) References Cited

OTHER PUBLICATIONS

International Search Report and Written Opinion issued by the ISA/US Commissioner for Patents, dated Jan. 17, 2018, for International Application No. PCT/US2017/052236_11pgs.
International Preliminary Reporton Patentability received for PCT Patent Application No. PCT/US2017/052236, dated Mar. 28, 2019, 9 pages.

* cited by examiner

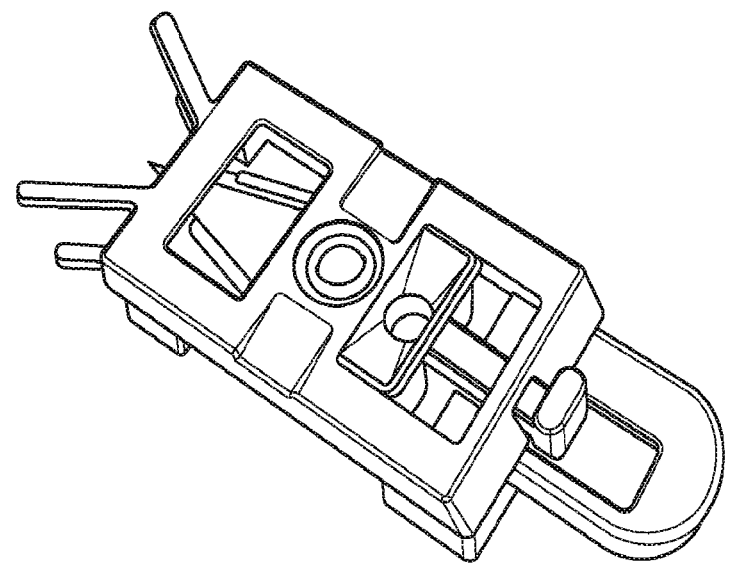
FIG. 5A
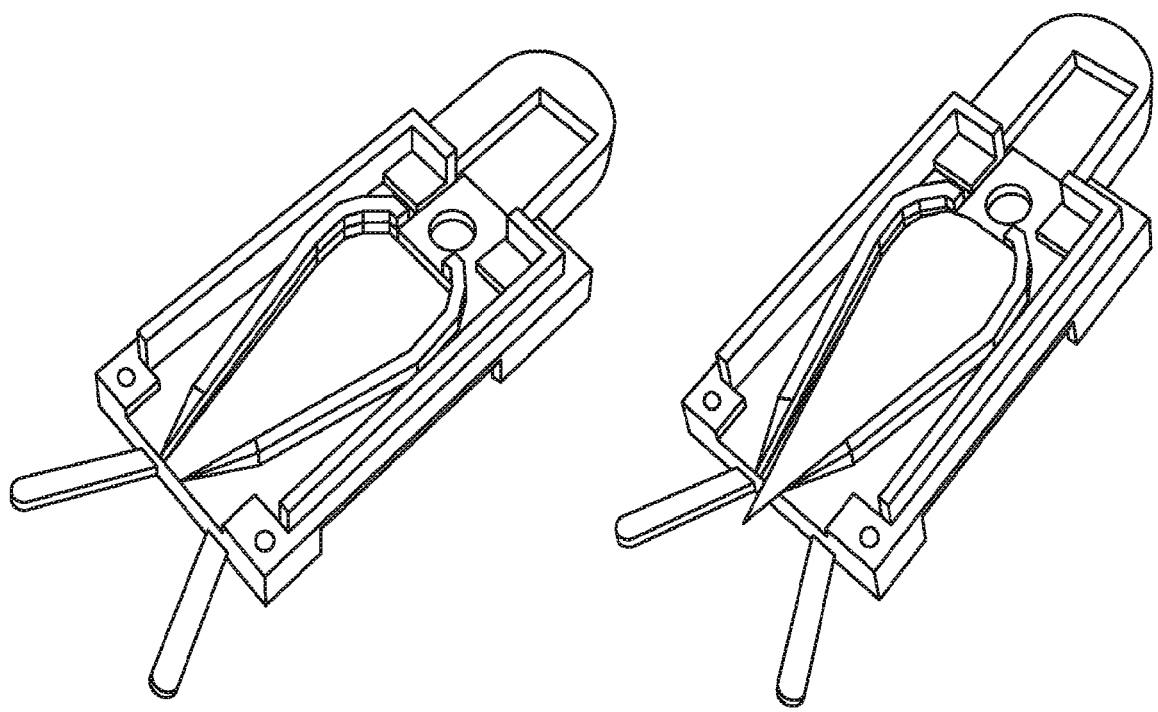
FIG. 5B
FIG. 5C

CARTRIDGES, SYSTEMS, AND METHODS FOR MASS SPECTROMETRY

CROSS-REFERENCE TO RELATED APPLICATIONS

The present application is a U.S. national stage under 35 U.S.C. § 371 of International Application No. PCT/US2017/052236, filed on Sep. 19, 2017, which claims the benefit of and priority to U.S. Provisional Application No. 62/396,768, filed on Sep. 19, 2016, the entire disclosures of which are expressly incorporated herein by reference in their entireties.

GOVERNMENT SUPPORT

This invention was made with government support under 2014-R2-CX-K007 awarded by the National Institute of Justice of the United States Department of Justice. The government has certain rights in the invention.

FIELD OF THE DISCLOSURE

This disclosure relates to systems and methods for mass spectrometry. More specifically, this disclosure relates to cartridges for use in mass spectrometry.

BACKGROUND

Mass spectrometry (MS) is one analytical chemistry technique that helps to identify the amount and type of chemicals present in a sample by measuring the mass-to-charge ratio and abundance of gas-phase ions. There are several steps required to perform MS analysis on complex samples. In some uses of MS, these steps include extraction, pre-concentration, and sample ionization. These steps can cause certain MS tests to be time-consuming, expensive, and complex.

MS is the gold standard for performing trace analysis in complex mixtures, but many laborious sample preparation steps generally must be carried out in the laboratory to perform the analyses.

Ion generation using wetted porous material has simplified certain applications of MS. Exemplary systems and methods for ion generation using wetted porous material, such as, for example, paper-spray ionization, have been disclosed and claimed in U.S. Pat. No. 8,859,958, issued Oct. 14, 2014, the entire disclosure of which is hereby expressly incorporated herein by reference.

Paper-spray MS could have a significant impact as a rapid and simple method to assess patient compliance in methadone clinics, pain management clinics, in psychiatric patients, etc. While immunoassays are widely used for this purpose, their limitations for drug screening are well-known, including inadequate sensitivity and selectivity, which can result in false negatives and unacceptably high false positive rates. Faster and simpler methods for analyzing organic contaminants such as pharmaceuticals, abused drugs, pesticides, and personal care products in environmental samples are needed. Additionally, river or ground water monitoring is challenging because the detection limits required are low, often in the low part per trillion (ppt) range. In view of these limitations, improvements in selectivity and on-cartridge sample preparation methods would be a significant improvement over existing methods.

Driven by the desire to increase sample throughput and to perform MS based assays outside of a traditional analytical laboratory, there is a strong and growing interest in developing MS methods that are faster, simpler, and require less or even no sample preparation prior to analysis. Progress in this field accelerated rapidly with the discovery of two "ambient ionization" or "direct analysis" methods in 2004 and 2005, so-called because samples can be analyzed directly in ambient conditions without sample preparation. The two methods, desorption electrospray ionization (DESI) and direct analysis in real time (DART), helped to spark a new research field within the analytical community that has resulted in an array of new applications and new technologies that dramatically simplify MS based assays.

Paper-spray MS is a method for performing rapid, direct analysis of samples spotted on paper or another porous substrate. A liquid sample (e.g., blood or other biofluids, waste water, etc.) is spotted onto the paper and stored as a dried spot. Analysis is performed by depositing a small volume of solvent to the paper where it wicks through the porous substrate and sample by capillarity action. The paper, which in some instances is cut to a sharp point, is positioned a few millimeters away from the atmospheric pressure inlet of a mass spectrometer and a high voltage (e.g., 3-5 kV) is then applied directly to the paper, inducing an electrospray at the tip of the paper. The solvent evaporates from the charged droplets generated by the electrospray process, leaving gas phase ions of the analyte molecules which can then be detected by a mass spectrometer. Chemicals which are both soluble in the extraction/spray solvent and ionizable will be detected immediately by the mass spectrometer provided they are sufficiently concentrated.

Analytes are detected immediately if they are not appreciably retained by the short distance of substrate they travel through. The entire analysis takes about 60 seconds and requires only the paper substrate on which the sample is already stored, a small amount of solvent, and an electrical connection to a low-current, high voltage power supply.

Paper-spray has a number of advantages for performing rapid chemical analysis of complex samples by MS. Paper-spray requires no sample preparation. Direct analysis of blood, urine, and waste-water, has been demonstrated. Single digit ng/mL or sub-ng/mL detection limits for drugs, pharmaceuticals and other small molecules from these complex matrices are currently routine on commercial triple quadrupole mass spectrometers. The sample volume required for paper-spray is low. Methods published in the literature have used between 0.5 mL and 15 mL of sample. The small sample consumption of paper-spray is a significant advantage for volume limited samples.

Moreover, the paper substrate doubles as an ionization source and as a sample storage medium. Storage of dried biofluid samples in particular is known to improve sample stability at room temperature. The paper substrate is inexpensive and readily available. Clogging, which commonly occurs in conventional capillary electrospray ionization, is unlikely in paper-spray due to the multi-porous nature of the substrate. Carryover is not a problem because the ion source and everything that contacts the sample is discarded after each analysis. The amount of solvent required per sample is low (e.g., less than 100 mL), and all of the solvent is consumed so there is no solvent waste to dispose. Also, the need for liquid chromatography is removed, which simplifies the analysis and removes common sources of failure in HPLC-MS assays, such as leaks and clogged columns.

Much of the early work on paper-spray MS has focused on the targeted quantitative analysis of drugs and drug metabolites directly from dried biofluids. In this application, an isotopically labeled internal standard (IS) is typically mixed with the blood prior to deposition onto the paper.

Signals for the analytes and the corresponding IS's are then determined. Quantitation is achieved by simultaneously monitoring the analyte and the IS as they are extracted and ionized directly from the paper substrate. Due to the complexity of the matrix and the low drug levels, tandem MS ("MS/MS") or high-resolution MS ("HRMS") was done for this application. Multiple analytes can be simultaneously quantitated as long as analytes have different masses or generate different fragment ions during MS/MS. A summary of some of the paper-spray methods developed for the quantitative analysis of drugs from dried biofluid samples by paper-spray MS/MS are shown in Table 1 below.

TABLE 1

Some paper-spray methods for the quantitative analysis of drugs from dried blood.

| Drug | Molecular Ion | IS | Assay range (ng/mL) | Approximate LOD (ng/mL) |
|---|---|---|---|---|
| Imatinib | $[M + H]^+$ | $[H]_8$-imatinib | 4-8000 | 0.7 |
| Melphalan | $[M + H]^+$ | $[H]_8$-melphalan | 100-25000 | 20 |
| Pazopanib | $[M + H]^+$ | $[H]_4$-pazopanib | 100-50000 | 3 |
| Tacrolimus | $[M + Na]^+$ | $[H]_3$-tacrolimus | 1.5-30 | 0.08 |
| Cocaine | $[M + H]^+$ | $[H]_3$-cocaine | 10-800 | 0.05 |
| nicotine | $[M + H]^+$ | $[H]_3$-nicotine | 1-100 | 0.3 |

A number of other applications have been reported for paper-spray MS as well. These include profiling of lipids in bacteria and microalgae, online chemical monitoring of cell culture, detection of chemical contaminants in food, including plasticizers, melamine, pharmaceuticals, and 4-methylimidazole, analysis of acyl-carnitines from blood and urine, and as an ion source for a microfluidic chip.

Analyte chemical and physical properties and the type of sample matrix both significantly affect the limits of detection for paper-spray MS assays. In one comparative analysis of numerous small molecules, with a molecular weight range of 150 to 850, in blood samples with widely varying properties, the limit of detection ("LOD") varied over four orders of magnitude. The chemical matrix also significantly affects the LOD, with poorer signal intensity seen in dirtier matrices such as urine, waste water, and plasma. In a typical paper-spray MS analysis, increasing the sample volume beyond a couple of microliters does not improve detection limits because the size of the paper substrate and the volume of extraction/spray solvent has to be increased as well. Concentration of the analyte and/or removal of some of the matrix components that cause ion suppression is needed to improve detection limits.

Paper-spray has the potential to dramatically simplify and expand the utility of mass spectrometric assays. There are a number of limitations that need to be addressed if the field is to move forward, however.

First, the detection limits are often inadequate. While low or sub-ng/mL detection limits can be achieved in favorable cases, detection limits are significantly higher for chemical analytes that do not ionize as efficiently or cannot be recovered from the sample matrix as well. Additionally, detection limits are significantly higher on portable or miniature mass spectrometers due to size constraints limiting the MS performance. Performing paper-spray on challenging analytes, on applications where lower detection limits are required, or on portable mass spectrometers will require sample preparation methods to pre-concentrate the analytes or remove interfering matrix components.

Second, there is a lack of simple approaches for incorporating an IS into the sample, which is required for quantitative analysis and quality control. All of the assays in Table 1 mixed an IS solution into the liquid sample prior to spotting the sample onto the paper substrate. This raises a number of problems. If this operation is done at the point of collection, accuracy cannot be assured. If, on the other hand, the liquid sample is shipped to a lab so that a technician can perform this operation, then a significant advantage of paper-spray MS has been lost (e.g., the ease and stability of transporting samples as dried sample spots).

Third, in the case of drug, pharmaceutical, or metabolite measurement plasma is often preferred over blood. Plasma isolation is generally carried out by drawing venous blood into a collection tube by a phlebotomist and centrifuging the blood collection tube. In addition to being labor intensive, this approach requires that the blood be stored and transported as a liquid for several hours, which can be a problem for some unstable analytes. In addition, collection of blood and isolation of plasma in this manner is not possible in resource limited settings.

Another limitation of direct MS analysis methods is inadequate selectivity. Because there is no chromatography prior to the MS analysis, chemical discrimination in paper-spray and other direct MS analysis methods must occur by MS/MS or by HRMS alone. Isomers cannot be distinguished by HRMS. In some cases, MS/MS can distinguish structural isomers and even quantitate them simultaneously as long as they fragment differently upon collisional activation and have unique fragment ions. Closely related structural isomers, however, frequently fragment so similarly that no unique fragment ions exist.

Thus, there is still a need for simple, fast, and low-cost devices and methods for carrying out MS by ion generation using wetted porous materials, such as by paper-spray ionization. Furthermore, some conventional paper spray cartridges may be bulky and may require modification of conventional MS systems. Thus, new conventional paper spray cartridges that solve the aforementioned needs and yet can be used with conventional MS systems, including portable MS systems, are needed.

SUMMARY

Mass spectrometry cartridges including a base in mechanical communication with a spray substrate holder, an absorbent pad between the base and the spray substrate holder, and a translatable sample well holder interposed between the spray substrate holder and a top cover are disclosed herein. The top cover may be configured to house a conductive element, wherein when the translatable sample well holder is in a first position, the translatable sample well holder is vertically above the absorbent pad, and when the translatable sample well holder is in a second position, the translatable sample well holder is vertically above a spray substrate.

Also disclosed herein are various methods of analyzing a sample including adding the sample to a cartridge, wherein the cartridge comprises adding a solvent to the translatable sample well holder, positioning the sample medium in front of a mass spectrometer pressure inlet, applying an electrical potential to the sample, and analyzing the sample by mass spectrometry. The cartridge may include a base in mechanical communication with a spray substrate holder, an absorbent pad between the base and the spray substrate holder, and a translatable sample well holder interposed between the spray substrate holder and a top cover. The top cover may be configured to house a conductive element, wherein when the translatable sample well holder is in a first position, the translatable sample well holder is vertically above the absorbent pad, and when the translatable sample well holder is in a second position, the translatable sample well holder is vertically above a spray substrate.

Additional mass spectrometry cartridges disclosed herein may include a cartridge frame, a first conductive element in communication with the cartridge frame, a basin in communication with the cartridge frame, an extraction column in communication with the cartridge frame, a waste pad, a sample holder, a sample medium disposed in the sample holder, and a second conductive element in communication with the sample medium and the first conductive element.

Additional methods of analyzing a sample may include adding the sample to a cartridge, adding a solvent to the sample medium, positioning the sample medium in front of a mass spectrometer pressure inlet, applying an electrical potential to the sample, and analyzing the sample by mass spectrometry. The cartridge may include a base, a first conductive element in communication with the base, a basin in communication with the base, an extraction column in communication with the base, a waste pad, a sample holder, a sample medium disposed in the sample holder, and a second conductive element in communication with the sample medium and the first conductive element.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein:

FIG. 5A shows an assembled exemplary mass spectrometry cartridge with a paper;

FIG. 5B shows the exemplary mass spectrometry cartridge of 5A with the paper and top removed;

FIG. 5C shows the exemplary mass spectrometry cartridge of 5B with the paper placed in the spray substrate bore;

Figure 1:
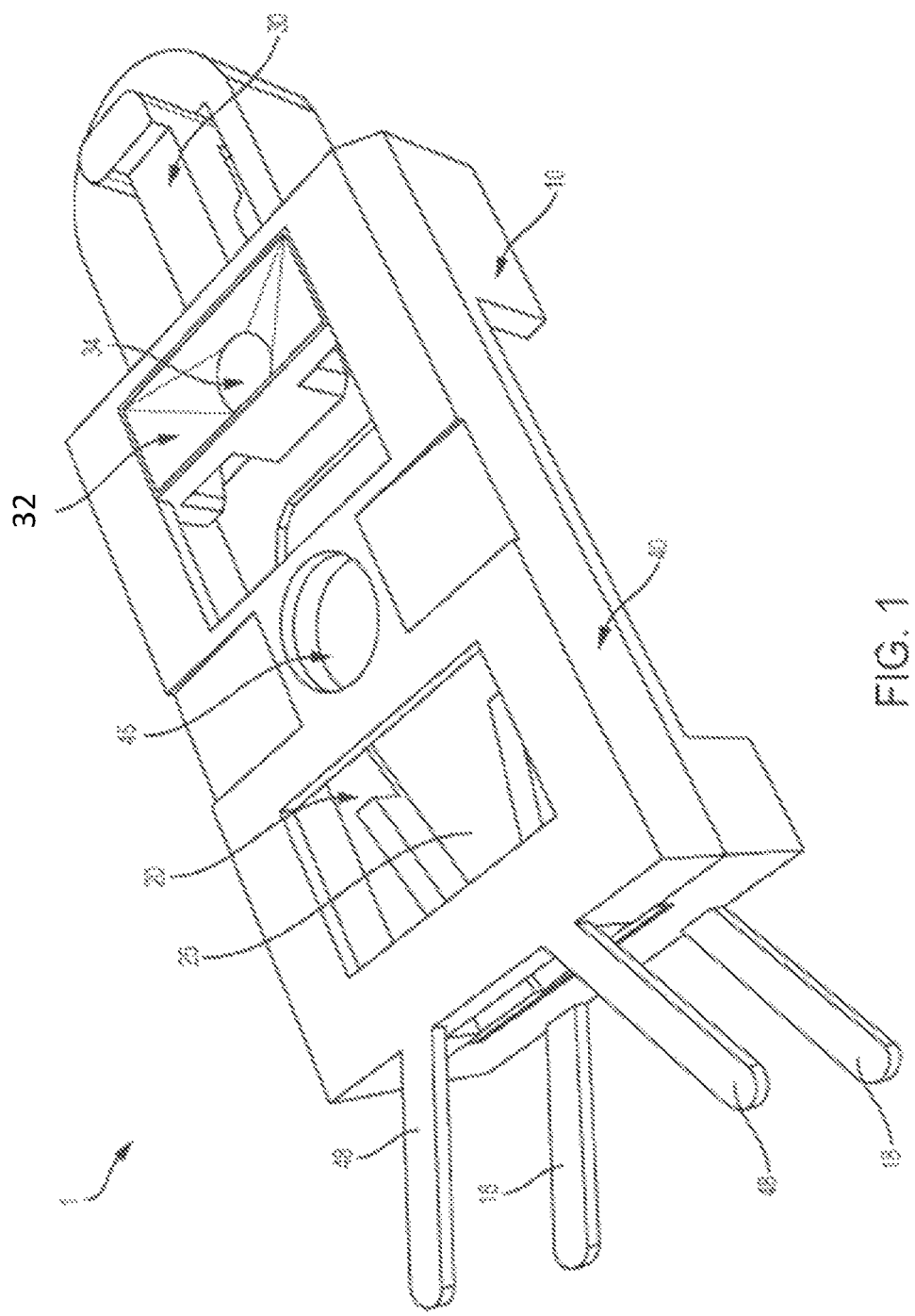
FIG. 1 is a perspective view of an exemplary mass spectrometry cartridge.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize its teachings.

"Paper spray" or "paper-spray" can be understood to include techniques for introducing samples of fluids (e.g., unprocessed samples of fluids such as blood or urine) to a mass spectrometer, such as through combining chromatography substrates and electrospray ionization to allow for the direct analysis of fluids. For some fluids, processing of the fluids may be needed to allow for detection by mass spectrometry (MS). This can include extraction and pre-concentration of the fluid. As described below, the cartridges and methods of the present disclosure may allow for paper-spray cartridges that have an integrated solid phase extraction ("SPE") column to be used with conventional MS systems.

As used herein, the MS systems are not particularly limited and can be any system that uses an analytical technique that ionizes a chemical species and then subsequently sorts the ions based on their mass to charge ratio. Exemplary mass-spectrometry systems include Thermo® TSQ® Vantage, a registered mark of the Thermo Finnigan, LLC, a Delaware LLC or a Sciex® Qtrap 5500, a registered mark of Sciex, a Canadian corporation located in Ontario, Canada.

The mass spectrometry cartridges and methods allow for an inexpensive, and in some cases, a single-use cartridge designed to perform extraction and pre-concentration steps to separate chemical analytes from the sample matrix and also to allow for the increased concentration of the analyte prior to analysis. The cartridges and methods disclosed herein can simplify the process because, for example, the cartridges can perform multiple steps of preparation of the samples in a straight-forward manner for very complex samples, such as plasma, urine, waste water, etc., which can be directly added to the cartridge.

The cartridge also can reduce or eliminate pumping or other active methods because the sample can be fed through the device passively with gravity and/or capillary action. The sample can then be stored on the cartridge as a dried sample while it is shipped to the laboratory. Once at the laboratory, a solvent can then be added, which may wick through the cartridge by capillary action and recover the analyte and then gas-phase ions may be generated for mass spectrometry analysis.

FIG. 1 illustrates an exemplary mass spectrometry cartridge according to various embodiments or aspects of this disclosure having one or more of the aforementioned benefits and features. Mass spectrometry cartridge 1 may include a base 10, a spray substrate holder 20, a translatable sample well holder 30, and a top cover 40. The base 10 and the top cover 40 may include base protective prongs 18 and top cover protective prongs 48 to protect a portion of the spray substrate (not shown in FIG. 1 to illustrate spray substrate bore 24). Top cover 40 may be configured to hold a conductive element (e.g., with conductive element aperture 45).

The mass spectrometry cartridge may be configured so that when the translatable sample well holder 30 is in a first position (as shown in FIG. 1), the translatable well holder 30 is vertically above the absorbent pad (not shown) and when the translatable sample well holder 30 is in a second position, the translatable well holder 30 is in a second position, the translatable well holder 30 is vertically above a spray substrate, which would be in spray substrate bore 24.

Figure 2A:
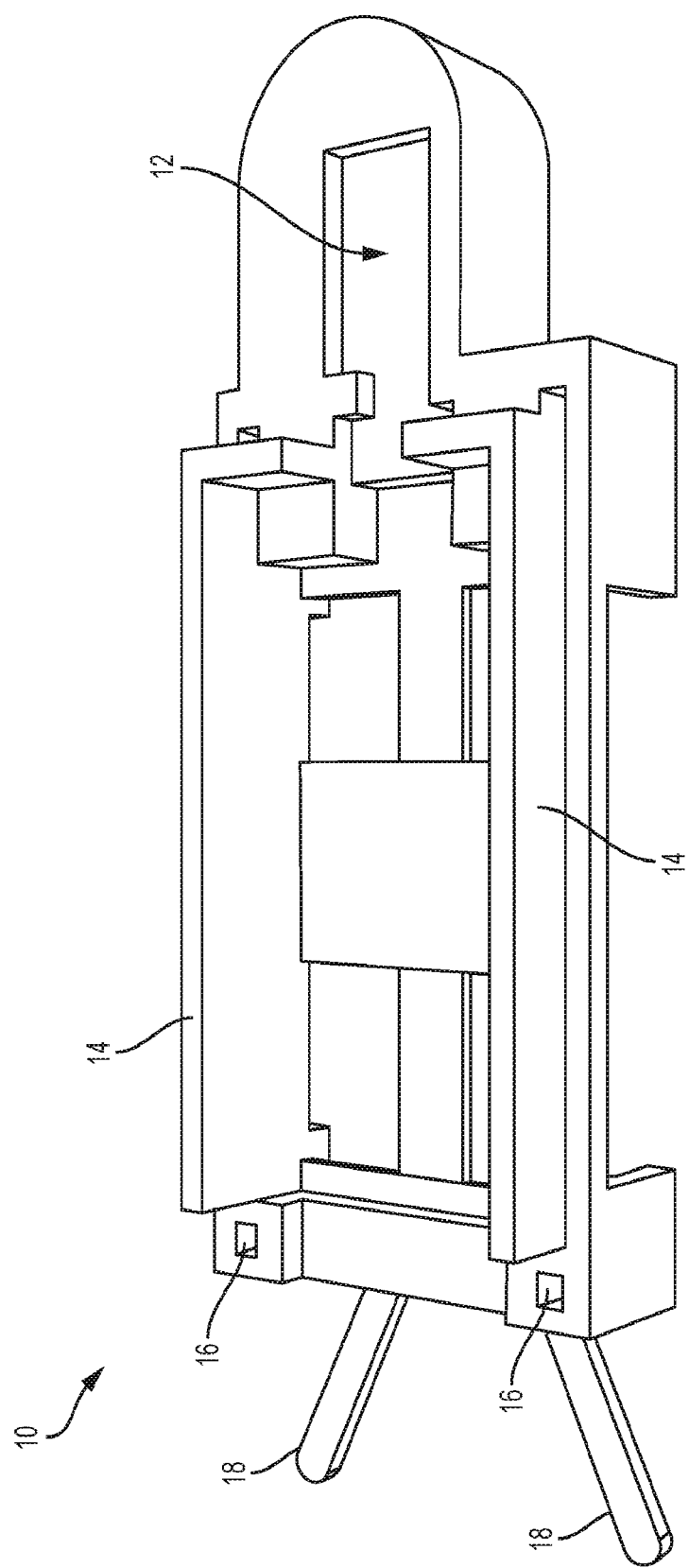
FIG. 2A is a perspective view of a base of an exemplary mass spectrometry cartridge.

FIG. 2A illustrates the base 10 with the absorbent pad removed. Absorbent pad bore 12 may be configured to house an absorbent pad (not shown) below the translatable well holder 30, when the translatable sample well holder 30 is in a first position (shown in FIG. 1). Side walls 14 may be configured to hold additional portions of the absorbent pad and/or position the spray substrate holder. Grooves 16 may be configured to mate with dowels 46 of top cover 40, shown in FIG. 2D, to help secure the cartridge as one piece.

Figure 2B:
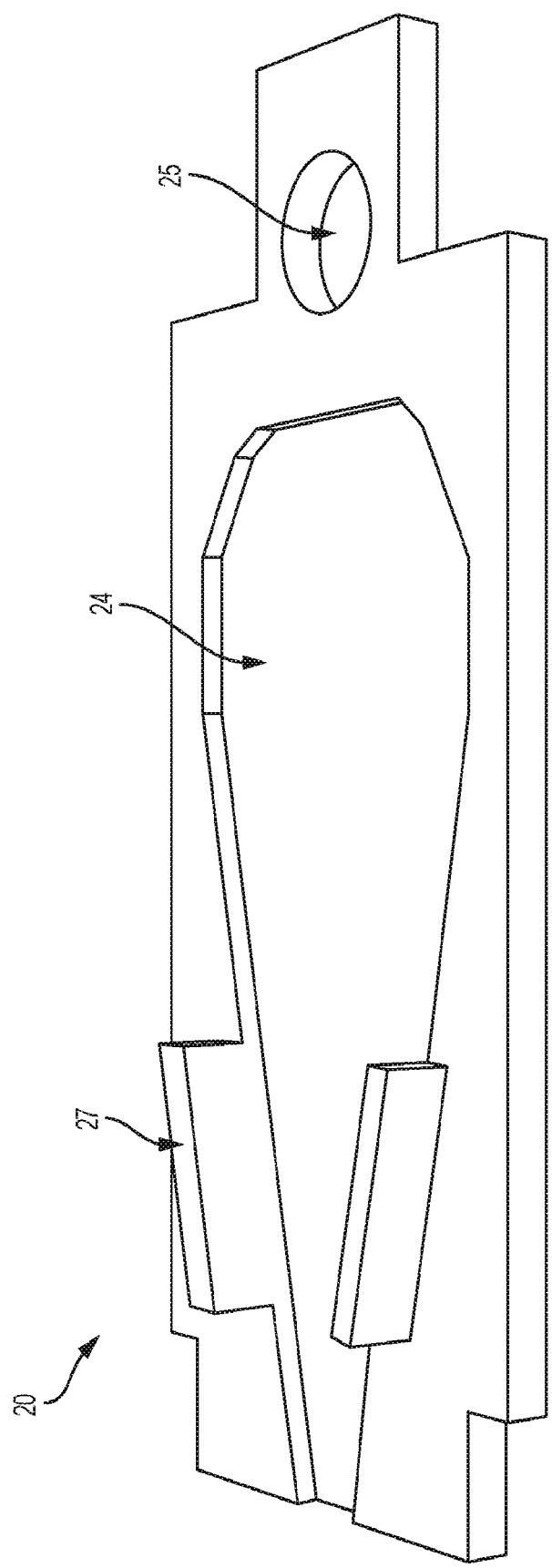
FIG. 2B is a perspective view of a substrate holder of an exemplary mass spectrometry cartridge.

FIG. 2B illustrates the spray substrate holder 20, which may comprise spray substrate bore 24 configured to hold the spray substrate (e.g., a paper spray substrate). In some embodiments, substrate bore may have raised barrier 27 to help position the spray substrate.

Figure 2C:
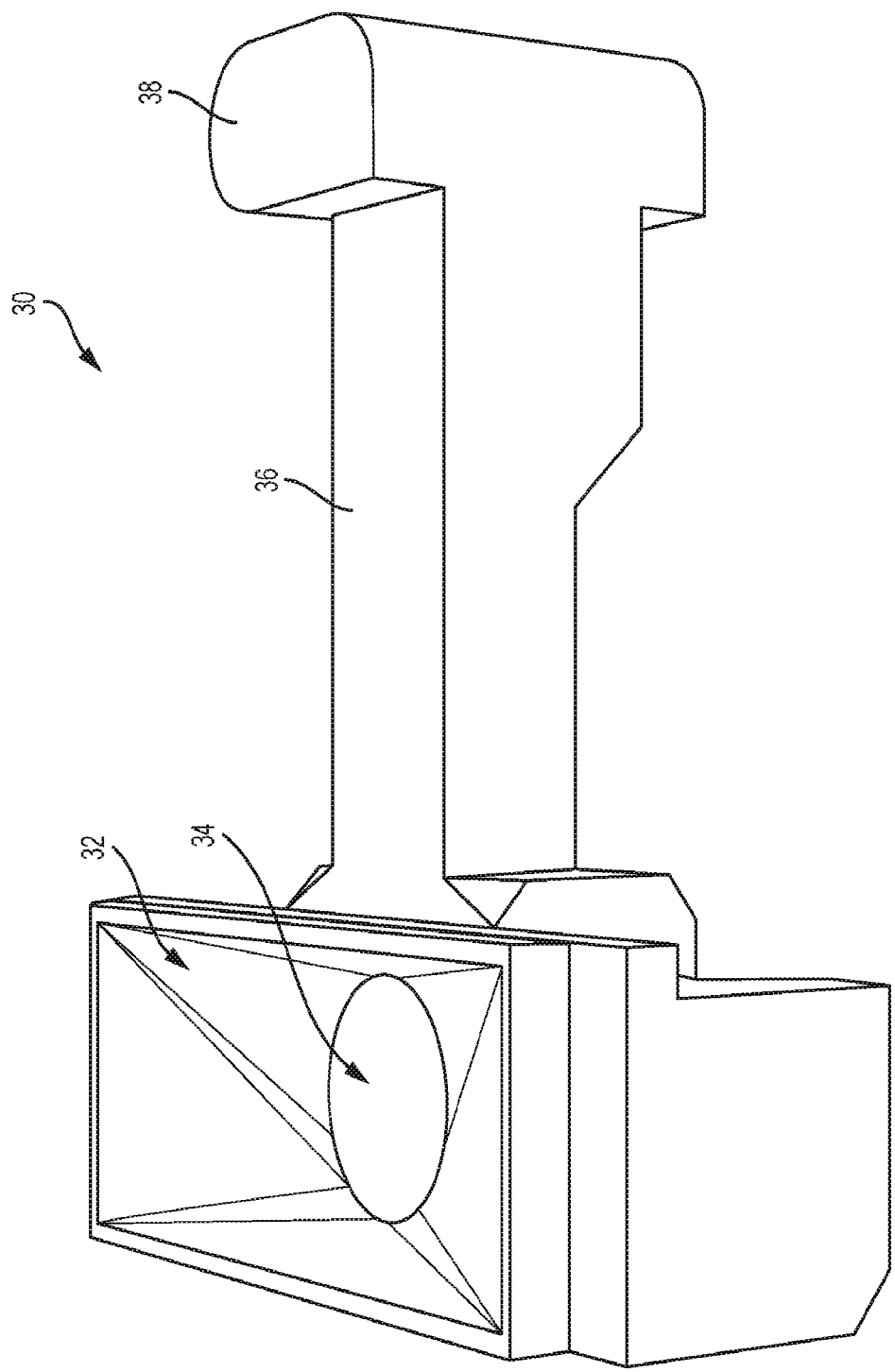
FIG. 2C is a perspective view of translatable sample well holder of an exemplary mass spectrometry cartridge.
Figure 2D:
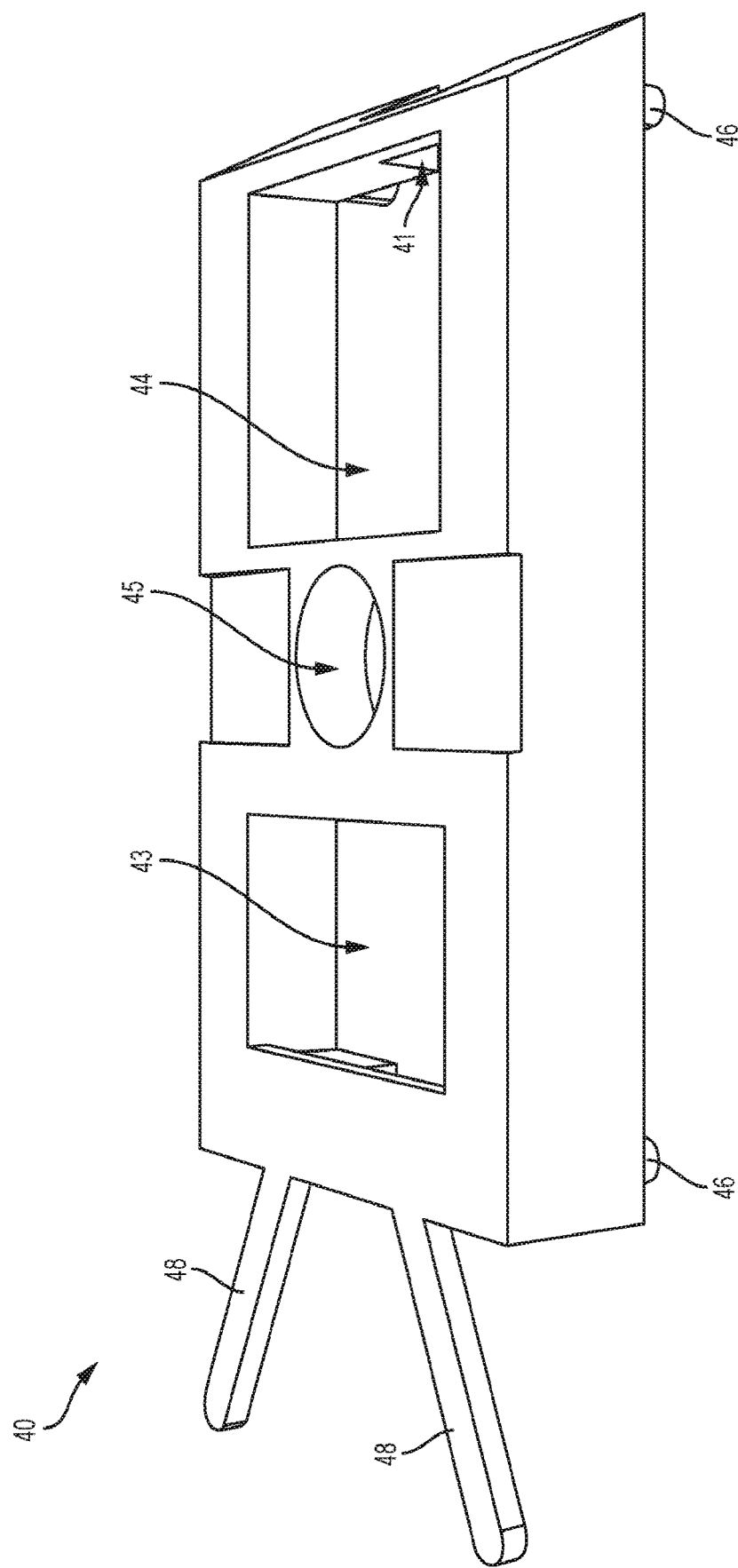
FIG. 2D is a perspective view of a top cover of an exemplary mass spectrometry cartridge.
Figure 2E:
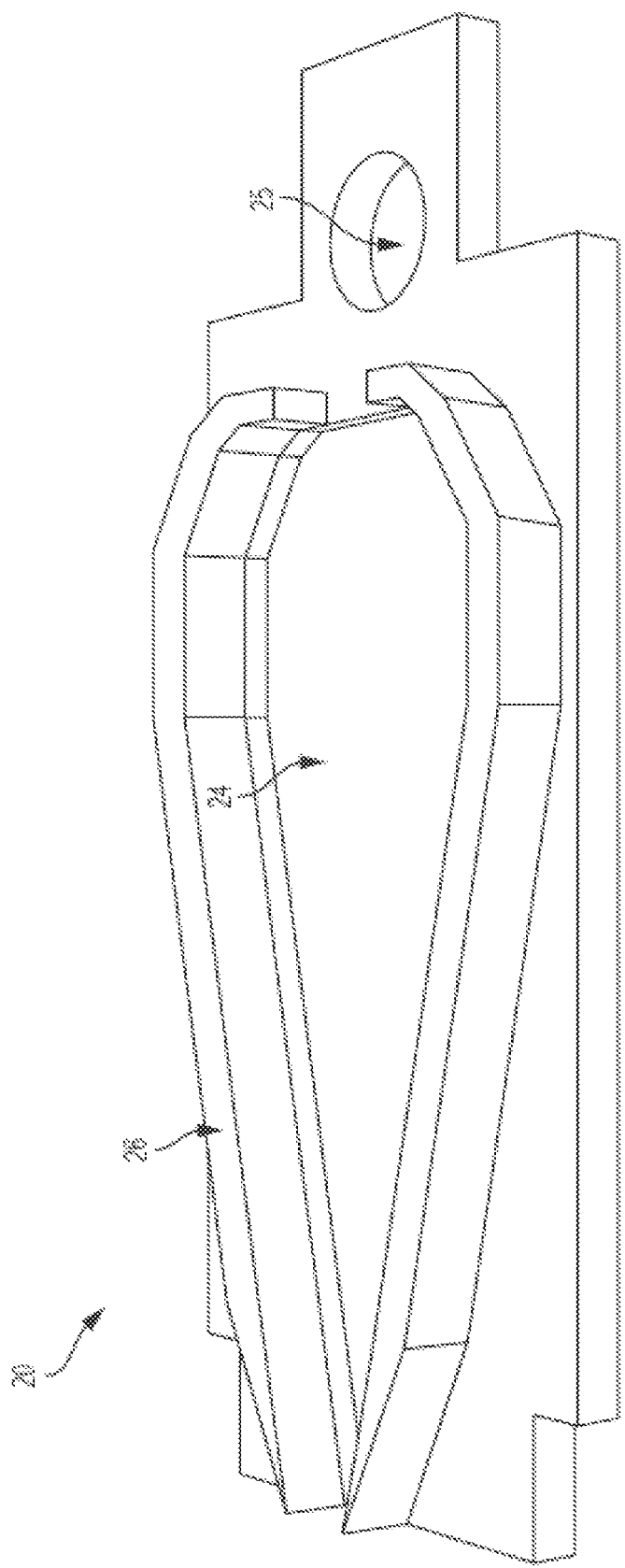
FIG. 2E is a perspective view of a substrate holder of an exemplary mass spectrometry cartridge having an extended wall.

In some embodiments, for example with temporary reference to FIG. 2E, the extended raised barrier 26 may extend around a majority, or in some embodiments, all around spray substrate bore 24 except the portion reserved for the protruding tip of the paper. Without being limited to any embodiment, it is believed that an extended raised barrier 26 may help to keep the paper positioned within the cartridge and may also help contain the solvent within the paper. Containing the solvent within the spray substrate bore 24 may (i) help to prevent the loss of solvent from overflowing over the paper, which can lead to a lower apparent recovery of the analyte, and (ii) help the formation of the spray plume to be more robust by ensuring that the paper is adequately wetted.

With reference back to FIG. 2B, spray substrate holder 20 may also include a pass-through hole 25 that is vertically below the translatable sample well holder 30 when the translatable sample well holder 30 is in the first position. This may allow the additional material not retained by the pre-concentration column (e.g., a solid phase extraction column ("SPE")) that passes through to be collected and separated from the rest of the cartridge, thus allowing the concentration and extraction of the desired analytes.

FIG. 2C illustrates the translatable sample well holder 30 according to various embodiments. Translatable sample well holder 30 may include at least one basin 32. At the bottom of basin 32, a pre-concentration column may be disposed within pre-concentration column bore 34. Basin 32 may assist with the funneling or channeling of the sample through the pre-concentration column and may also reduce the potential for spillage around or on the mass spectrometry cartridge. The translatable sample well holder 30 may also include an extension member configured to translate the translatable sample well holder from the first position to the second position, such as extension member 36 and tab 38.

FIG. 2D shows exemplary top cover 40 having a first opening 44 and a second opening 43. In some embodiments, such as the embodiment shown in FIG. 1, first opening 44 may be configured to house a portion of the sample well holder 30 in both the first position and the second position. In some embodiments, the sample well holder 30 may be housed in first opening 44 in the first position and may translated to the second position, housing sample well holder 30 in the second opening of 43 of top cover 40. To assist with the translation of sample well holder 30, the top cover 40 may contain chamber 41, which may allow for the extension member 36 to translate (e.g., horizontally translate) the sample well holder 30, a portion of which may be between top cover 40 and base 10.

The top cover 40 may also be configured to hold a conductive element. FIG. 2D illustrates top cover 40 with conductive element aperture 45. The exemplified conductive element aperture 45 of FIG. 2D is configured to hold a metal sphere, such as a stainless steel ball bearing. The conductive material is not particularly limited, so long as the material is sufficiently large and sufficiently conductive to transport an electrical potential (e.g. a high voltage between about 3-5 kV) to the spray substrate.

FIG. 5A shows a photo of an assembled exemplary mass spectrometry cartridge with a paper. As can be seen in FIG. 5B, the base and substrate holder may be configured to hold the paper, which is shown placed in the substrate holder in FIG. 5C.

Figure 3:
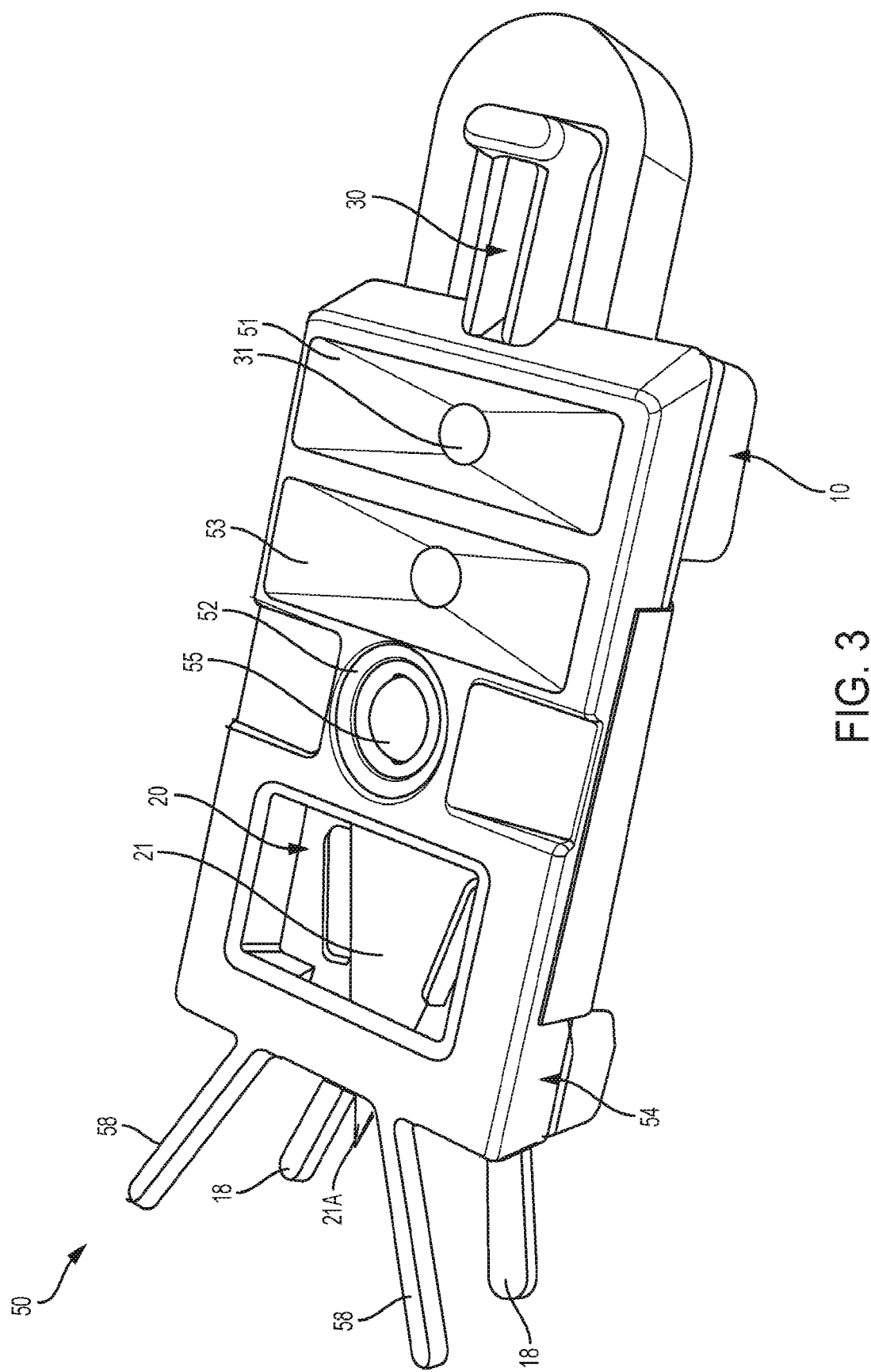
FIG. 3 is a perspective view of another exemplary mass spectrometry cartridge.

FIG. 3 illustrates a mass spectrometry cartridge 50 that has a plurality of basins and a paper-spray substrate 21. In some embodiments, the top cover may have at least one basin. In such embodiments, the solid phase extraction ("SPE") column 31 of the sample well holder 30 may translate beneath the at least one basin of the top cover. For example, the mass spectrometry cartridge 50 shown in FIG. 3 shows top cover 54 having two basins, a sample basin 51 and an elution basin 53. Thus, in this embodiment, the SPE 31 of the sample well holder 30 translates beneath the sample basin 51 and the elution basin 53. Base 10 is shown as being coupled to top cover 54. In such a configuration, base protective prongs 18 and top cover protective prongs 58 can help to protect the tip 21A of the paper-spray substrate 21.

Figure 4A:
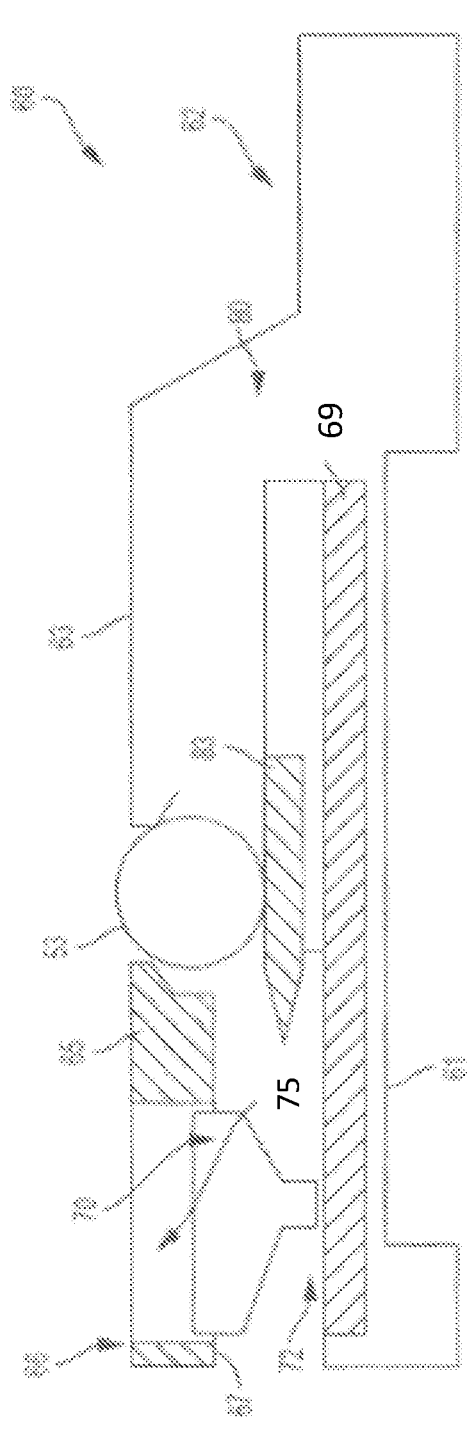
FIG. 4A is a perspective view of yet another exemplary mass spectrometry cartridge in a closed position.
Figure 4B:
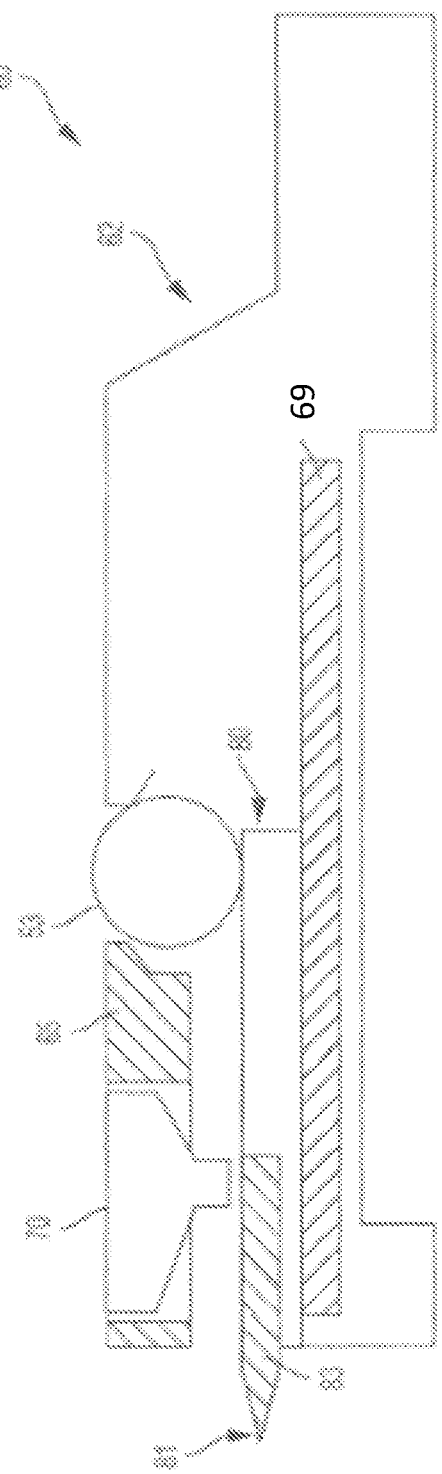
FIG. 4B is a perspective view of the exemplary mass spectrometry cartridge of FIG. 4A in an open position.

FIGS. 4A and 4B illustrate a mass spectrometry cartridge where the sample holder is configured to translate. FIG. 4A illustrates mass spectrometry cartridge 60 in the closed or protected state, while FIG. 4B illustrates the mass spectrometry cartridge 60 in the open or testing state. Mass spectrometry cartridge 60 may include a cartridge frame 62 having a base 61 and a top 63. Top 63 may have aperture 66 between forward member 67 and intermediate member 65 for housing a translatable basin 70.

Figure 4D:
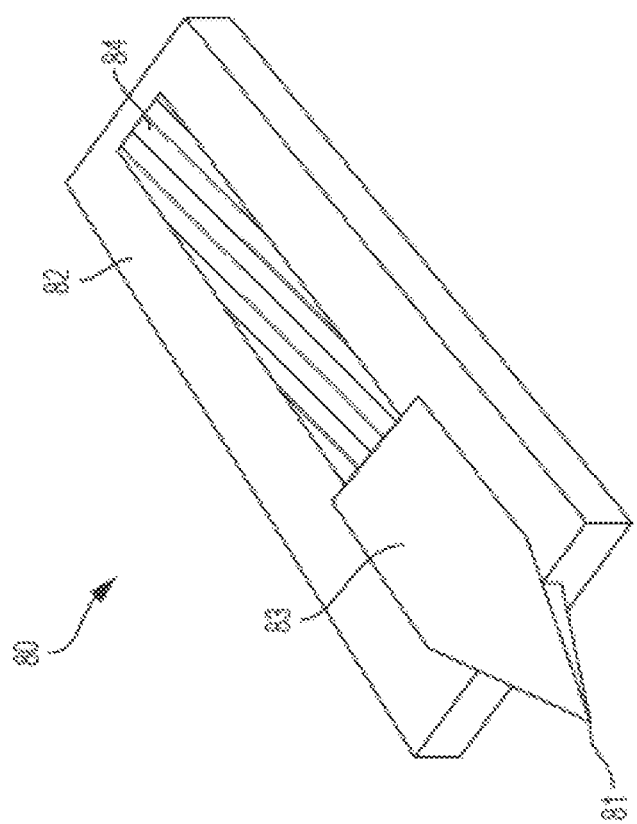
FIG. 4D is a perspective view of a sample holder according to various embodiments.
Figure 4C:
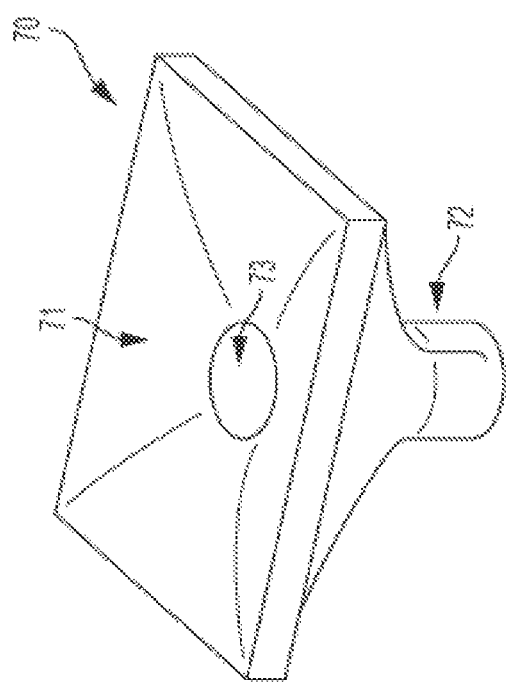
FIG. 4C is a perspective view of a basin of an exemplary mass spectrometry cartridge.

Thus, the basin 70 may be in communication with the cartridge frame 62. As best shown in FIG. 4C, basin 70 may include a plurality of angled sides 71 and a drain 73. In some embodiments, the drain 73 may be placed over the extraction column. Also, in some embodiments, the extraction column 72 may be in communication with the frame. For example, FIGS. 4A and 4B illustrate extraction column 72 forming a part of the basin 70.

In a first position, the extraction column 72 is placed over the waste pad 69. Sample holder 80 is retracted and, thus, the sample medium 83 that is disposed in the sample holder 80 is also retracted in the first position. Thus, waste materials not collected by extraction column 72 collect on waste pad 69.

When sample holder 80 is translated to a second position (shown in FIG. 4B), the sample medium 83 is disposed under the translatable basin 70. The placement of the sample holder 80 and the sample medium 83 under the translatable basin 70 causes the translatable basin 70 to rise off the waste pad and translate the distance 75. The tip 81 of the sample medium 83 is then exposed and may then be further processed and tested in a mass spectrometer system.

To transport an electric potential or voltage to the sample medium 83, an electrical potential may be applied to a first conductive element 53, which is in communication with the cartridge frame 62. Referring to FIG. 4D, sample holder 80 may comprise an outer frame 82 configured to house the sample medium 83 and a second conductive element 84, such as a metal (e.g., aluminum strip). The second conductive element 84 may be configured so that when the sample holder 80 is translated to the second position shown in FIG. 4B, the second conductive element is in communication with the first conductive element. The communication is not particularly limited and may include physical communication (e.g., touching), electrical communication (e.g., capable of transferring an electric potential), or both. Thus, when an electric potential is applied to the mass spectrometer cartridge 60, it may travel through the first conductive element 53, to the second conductive element 84, and finally to the sample medium 83 and sample contained therein. As can be seen in FIG. 4B, when in the second position, tip 81 of sample medium 83 is exposed outside cartridge 62.

Figure 6:
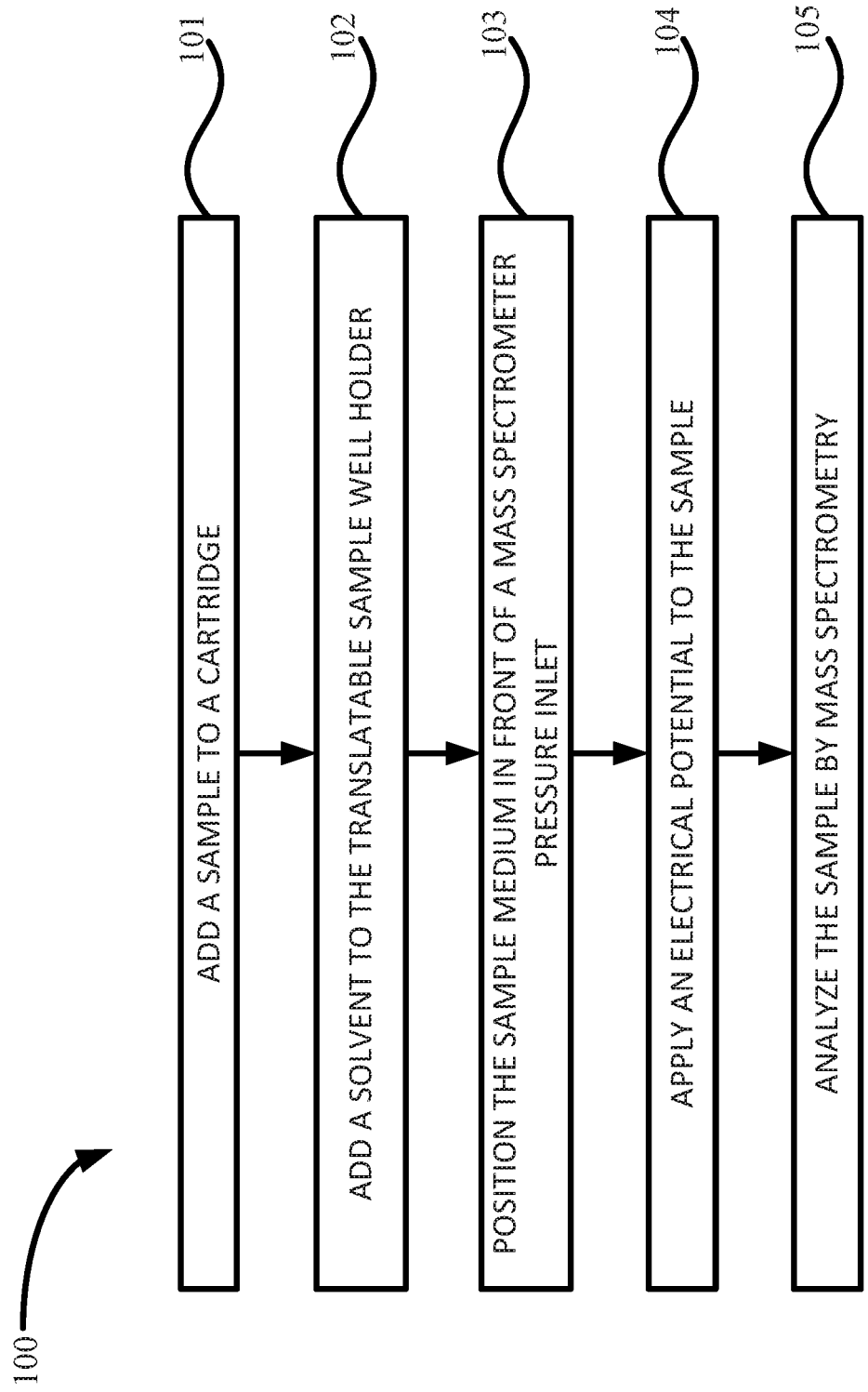
FIG. 6 shows a flow diagram of a method of analyzing a sample according to various embodiments.

FIG. 6 is a flow diagram illustrating a method 100 of testing a sample according to various embodiments. Method 100 of testing a sample may include adding the sample to a cartridge (step 101), adding a solvent to the translatable sample well holder (step 102), positioning the sample medium in front of a mass spectrometer pressure inlet (step 103), applying an electrical potential to the sample (step 104), and analyzing the sample by mass spectrometry (step 105).

The cartridge used in method 100 of testing a sample may include cartridges having a base in mechanical communication with a spray substrate holder, an absorbent pad between the base and the spray substrate holder, a translatable sample well holder interposed between the spray substrate holder and a top cover, the top cover configured to house a conductive element, wherein when the translatable sample well holder is in a first position, the translatable well holder is vertically above the absorbent pad, when the translatable sample well holder is in a second position, the translatable well holder is vertically above a spray substrate. For example, the cartridge used in method 100 of testing a sample may include the cartridges exemplified in FIGS. 1 and 3.

Various methods may also include translating the sample well holder and adding an elution solvent to a solid phase extraction column contained in the sample well holder after translating the sample well holder. Other embodiments may include adding an elution solvent to a sold phase extraction column contained in the sample well holder after translating the sample well holder.

Figure 7:
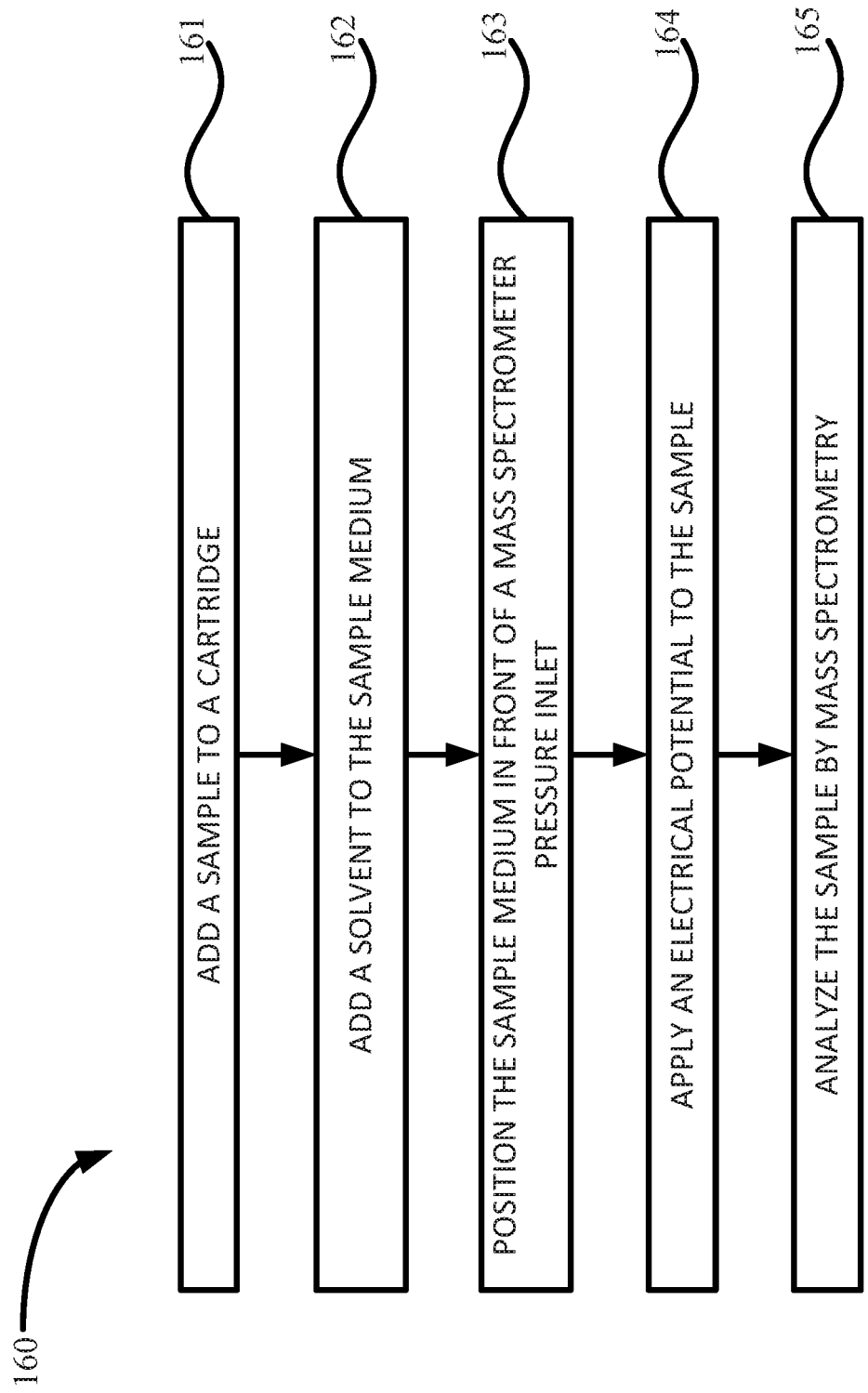
FIG. 7 shows a flow diagram of another method of analyzing a sample according to various embodiments.

FIG. 7 is a flow diagram showing another method of testing a sample according to various embodiments. Method 160 of analyzing a sample may include adding the sample to a cartridge (step 161), adding a solvent to the sample medium (step 162), positioning the sample medium in front of a mass spectrometer pressure inlet (step 163), applying an electrical potential to the sample (step 164), and analyzing the sample by mass spectrometry (step 165). Various methods may also include translating the sample holder to expose a portion of the sample medium, such as shown in FIG. 4B.

In method 160 of analyzing a sample, the cartridge may comprise a cartridge frame, a first conductive element in communication with the cartridge frame, a basin in communication with the cartridge frame, an extraction column in communication with the cartridge frame, a waste pad, a sample holder, a sample medium disposed in the sample holder, and a second conductive element in communication with the sample medium and the first conductive element. For example, the cartridge may be the cartridge exemplified in FIGS. 4A and 4B.

While this disclosure has been described with the aforementioned exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mass spectrometry cartridge comprising:
a base in mechanical communication with a spray substrate holder holding a paper spray substrate having a protruding tip;
the spray substrate holder having an extended raised barrier extending around a majority of a spray substrate bore except for a portion reserved for the protruding tip of the paper spray substrate, wherein the extended raised barrier conforms to the shape of the spray substrate bore to contain a solvent within the spray substrate bore and the spray substrate bore conforms to the shape of the paper spray substrate;
an absorbent pad between the base and the spray substrate holder;
a translatable sample well holder having a solid phase extraction column interposed between the spray substrate holder and a top cover so that the translatable sample well holder is translatable relative to the spray substrate holder and the top cover, the top cover configured to house a conductive element, wherein
when the translatable sample well holder is in a first position, the translatable sample well holder is vertically above the absorbent pad so that the translatable sample well holder is interposed between the absorbent pad and the top cover,
when the translatable sample well holder is in a second position, the translatable sample well holder is vertically above a spray substrate so that the translatable sample well holder is interposed between the spray substrate and the top cover.

2. The mass spectrometry cartridge of claim 1, wherein the spray substrate holder comprises a pass-through hole that is vertically below the translatable sample well holder when the translatable sample well holder is in the first position.

3. The mass spectrometry cartridge of claim 1, wherein the translatable sample well holder comprises an extension member configured to translate the translatable sample well holder between the first position and the second position.

4. The mass spectrometry cartridge of claim 3, wherein the extension member is configured to horizontally translate the translatable sample well holder from the first position to the second position.

5. The mass spectrometry cartridge of claim 1, wherein the translatable sample well holder comprises at least one basin.

6. The mass spectrometry cartridge of claim 5, further comprising a pre-concentration column in the translatable sample well holder.

7. The mass spectrometry cartridge of claim 1, wherein the top cover comprises at least one basin.

8. The mass spectrometry cartridge of claim 7, wherein the at least one basin includes a sample basin and an elution basin.

9. The mass spectrometry cartridge of claim 1, wherein the translatable sample well holder has an extension member.

10. The mass spectrometry cartridge of claim 9, wherein the extension member is located opposite the protruding tip.

11. The mass spectrometry cartridge of claim 9, wherein the top cover includes a first opening configured to house a portion of the translatable sample well holder, and a chamber configured to allow the extension member to translate the translatable sample well holder between the top cover and the base.

12. A method of analyzing a sample, comprising
(i) adding the sample to a cartridge, wherein the cartridge comprises a base in mechanical communication with a spray substrate holder holding a paper spray substrate having a protruding tip;
the spray substrate holder having an extended raised barrier extending around a majority of a spray substrate bore except for a portion reserved for the protruding tip of the paper spray substrate, wherein the extended raised barrier conforms to the shape of the spray substrate bore to contain a solvent within the spray substrate bore and the spray substrate bore conforms to the shape of the paper spray substrate;
an absorbent pad between the base and the spray substrate holder;
a translatable sample well holder having a solid phase extraction column, the translatable sample well holder interposed between the spray substrate holder and a top cover so that the translatable well holder is translatable relative to the spray substrate holder and the top cover, the top cover configured to house a conductive element, wherein
when the translatable sample well holder is in a first position, the translatable sample well holder is vertically above the absorbent pad so that the translatable sample well holder is interposed between the spray substrate and the top cover,
when the translatable sample well holder is in a second position, the translatable sample well holder is vertically above a spray substrate so that the translatable sample well holder is interposed between the spray substrate and the top cover;
(ii) adding a first solvent to the translatable sample well holder while the translatable sample well holder is in the first position;
(iii) positioning a sample medium in front of a mass spectrometer pressure inlet;
(iv) applying an electrical potential to the sample; and
(v) analyzing the sample by mass spectrometry.

13. The method of claim 12, further comprising translating the translatable sample well holder and adding a second solvent, wherein the second solvent is an elution solvent, to a solid phase extraction column contained in the translatable sample well holder after translating the translatable sample well holder.

14. The method of claim 12, further comprising adding a second solvent, wherein the second solvent is an elution solvent, to a solid phase extraction column contained in the translatable sample well holder after translating the translatable sample well holder.

15. The method of analyzing a sample of claim 12, wherein the translatable sample well holder has an extension member.

16. The method of analyzing a sample of claim 15, wherein the extension member is located opposite the protruding tip.

17. The method of analyzing a sample of claim 15, wherein the top cover includes a first opening configured to house a portion of the translatable sample well holder, and a chamber configured to allow the extension member to translate the translatable sample well holder between the top cover and the base.

* * * * *